United States Patent
Mankala et al.

(10) Patent No.: US 10,855,521 B2
(45) Date of Patent: Dec. 1, 2020

(54) EFFICIENT REPLACEMENT OF CLIENTS RUNNING LARGE SCALE APPLICATIONS

(71) Applicant: VMWARE, INC., Palo Alto, CA (US)

(72) Inventors: Shyam Sundar Rao Mankala, Bangalore (IN); Servesh Singh, Bangalore (IN); Anne Holler, Palo Alto, CA (US); Arun Narayanaswamy, Bangalore (IN); Kiran Singh, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 394 days.

(21) Appl. No.: 14/876,847

(22) Filed: Oct. 7, 2015

(65) Prior Publication Data

US 2016/0380855 A1 Dec. 29, 2016

(30) Foreign Application Priority Data

Jun. 29, 2015 (IN) .......................... 3312/CHE/2015

(51) Int. Cl.
*H04L 12/24* (2006.01)

(52) U.S. Cl.
CPC ...... *H04L 41/0672* (2013.01); *H04L 41/0663* (2013.01); *H04L 41/0668* (2013.01)

(58) Field of Classification Search
USPC ................................................ 709/220–224
See application file for complete search history.

(56) References Cited

U.S. PATENT DOCUMENTS

| | | | |
|---|---|---|---|
| 9,697,026 B1* | 7/2017 | Liu | G06F 21/606 |
| 2015/0067143 A1* | 3/2015 | Babakhan | G06F 11/301 |
| | | | 709/224 |
| 2015/0143363 A1* | 5/2015 | Gombert | G06F 9/5083 |
| | | | 718/1 |
| 2015/0212842 A1* | 7/2015 | Ghosh | G06F 9/45533 |
| | | | 718/1 |
| 2016/0269311 A1* | 9/2016 | Brown | H04L 41/0806 |
| 2016/0299772 A1* | 10/2016 | Seenappa | G06F 9/45558 |

* cited by examiner

*Primary Examiner* — Younes Naji
*Assistant Examiner* — Da T Ton
(74) *Attorney, Agent, or Firm* — Loza & Loza, LLP

(57) ABSTRACT

A system and method for efficiently replacing clients running a large scale application uses a pool of clients, which includes a group of active clients running the large scale application and at least one standby client. When a particular active client is identified to be replaced, one of the at least one standby client is selected as a replacement client for the particular active client. The particular active client is replaced with the selected replacement client with respect to the running of the large scale application such that the particular client is removed from the group of active clients and the selected replacement client is added to the group of active clients.

13 Claims, 10 Drawing Sheets

EFFICIENT REPLACEMENT OF CLIENTS RUNNING LARGE SCALE APPLICATIONS

RELATED APPLICATION

Benefit is claimed under 35 U.S.C. 119(a)-(d) to Foreign application Serial No. 3312/CHE/2015 filed in India entitled "EFFICIENT REPLACEMENT OF CLIENTS RUNNING LARGE SCALE APPLICATIONS", filed on Jun. 29, 2015, by VMware, Inc., which is herein incorporated in it entirety by reference for all purposes.

BACKGROUND

Virtualized infrastructures are widely used to provide large-scale services, which typically involve executing multi-tier applications. Automation is key in enabling management of these large-scale services, where human handling of various tasks such as deployment, upgrades, recovery, etc. becomes infeasible. In order to maintain a smooth flow of services performed by a cluster of virtual machines running a multi-tier application in a virtualized infrastructure where failures are not uncommon, poor-performing or "sick" virtual machines should be detected and replaced.

There are currently known automated techniques to detect poor-performing virtual machines based on various metrics, such as response time or performance. However, there are no known techniques to replace the detected poor-performing virtual machines in an automated way. Thus, once poor-performing virtual machines are detected, these virtual machines are replaced manually by users, such as administrators, using existing management tools.

SUMMARY

A system and method for efficiently replacing clients running a large scale application uses a pool of clients, which includes a group of active clients running the large scale application and at least one standby client. When a particular active client is identified to be replaced, one of the at least one standby client is selected as a replacement client for the particular active client. The particular active client is replaced with the selected replacement client with respect to the running of the large scale application such that the particular client is removed from the group of active clients and the selected replacement client is added to the group of active clients.

A method for efficiently replacing clients running a large scale application in accordance with an embodiment of the invention comprises deploying a plurality of clients as a pool of clients to run the large scale application, the pool of clients including a group of active clients that will be running the large scale application and at least one standby client, identifying a particular client to be replaced from the group of active clients in the pool of clients that are currently running the large scale application, selecting one of the at least one standby client in the pool of clients as a replacement client, sending a command to wake up the selected replacement client, and replacing the particular client with the selected replacement client with respect to the running of the large scale application such that the particular client is removed from the group of active clients and the selected replacement client is added to the group of active clients. In some embodiments, the steps of this method are performed when program instructions contained in a computer-readable storage medium is executed by one or more processors.

A system for efficiently replacing clients running a large scale application in accordance with an embodiment of the invention comprises a client management unit and an application management unit. The client management unit is configured to manage clients on host computers. The application management unit is configured to deploy a plurality of clients as a pool of clients to run the large scale application, the pool of clients including a group of active clients that will be running the large scale application and at least one standby client, identify a particular client to be replaced from the group of active clients in the pool of clients that are currently running the large scale application, select one of the at least one standby client in the pool of clients as a replacement client, send a command to the client management unit to wake up the selected replacement client, and replace the particular client with the selected replacement client with respect to the running of the large scale application such that the particular client is removed from the group of active clients and the selected replacement client is added to the group of active clients.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
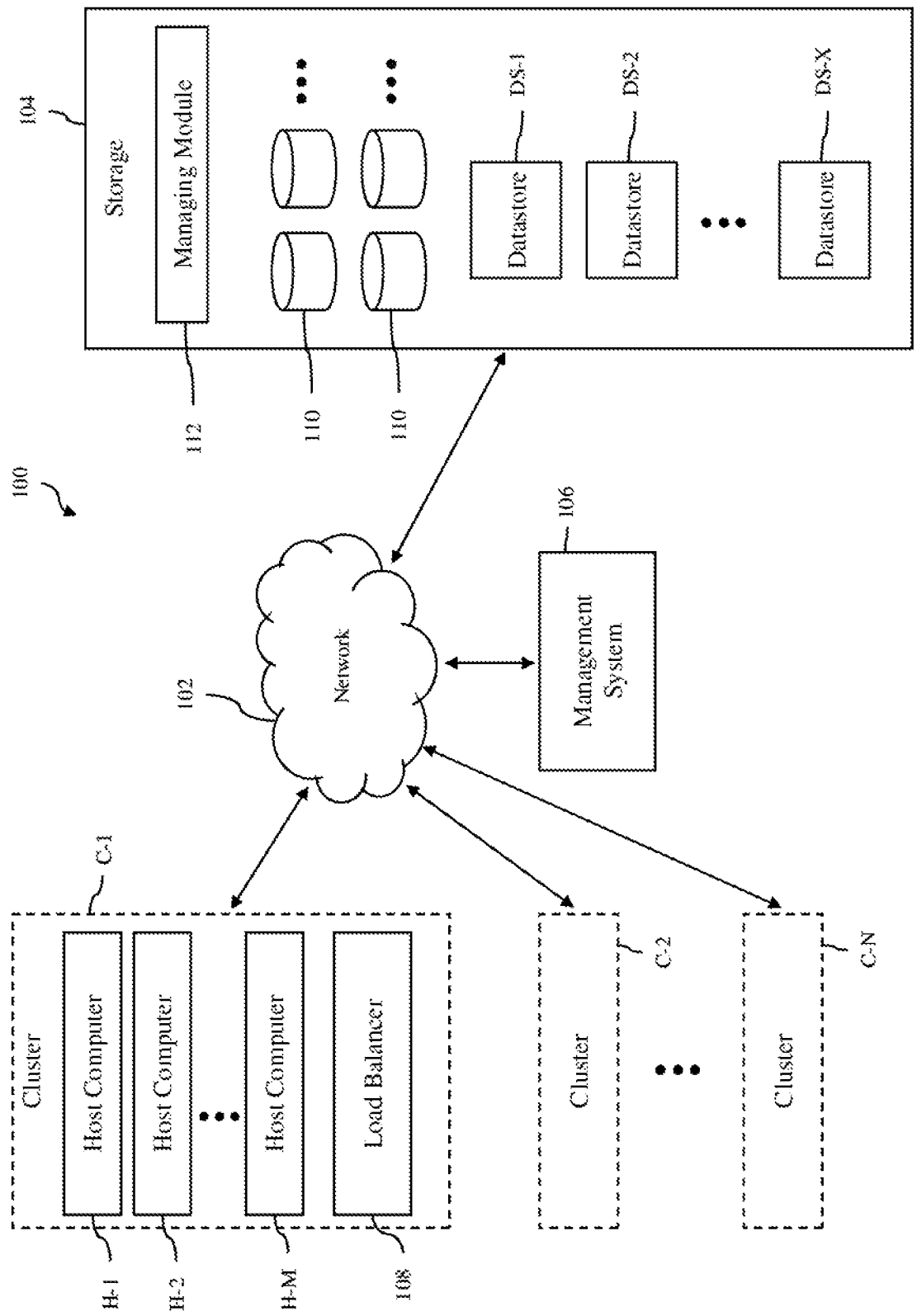
FIG. 1 is a block diagram of a distributed computer system in accordance with an embodiment of the invention.

Turning now to FIG. 1, a distributed computer system 100 that provides a computing environment in accordance with an embodiment of the invention is shown. The distributed computer system may be, for example, a computer network system. The distributed computer system can support a number of clients that can run various applications, such as large scale applications. As used herein, a large scale application is an application that requires multiple clients to run, such as a multi-tier application. An example of a multi-tier application is a web service application with a web tier, database tier and an application tier. As used herein "clients" refer to any software entities that can run on a computer system, such as software applications, software processes, virtual machines (VMs) and "containers" that provide system-level process isolation. As described in detail below, the distributed computer system includes components to execute an automated process of detecting poor-performing clients running a large scale application and quickly replacing these clients using backup clients that are ready to take over the operations performed by the poor-performing clients.

As shown in FIG. 1, the distributed computer system 100 includes a network 102, clusters C-1, C-2 . . . C-N of host computers (where N is a positive integer), storage 104 and a management system 106. The exact number of host computer clusters included in the distributed computer system can be any number of clusters from one to tens of clusters or more. The host computers of the different clusters, the storage and the management system are connected to the network. Thus, each of the host computers in the clusters and the management system are able to access the storage via the network and may share the resources provided by the storage. Consequently, any process running on any of the host computers and the management system may also access the storage via the network.

In the illustrated embodiment, each of the clusters C-1, C-2 . . . C-N includes a number of host computers H-1, H-2, . . . H-M (where M is a positive integer) and a load balancer 108. The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. The host computers may be servers that are commonly found in data centers. As an example, the host computers may be servers installed in one or more server racks. Typically, the host computers of a cluster are located within the same server rack.

Figure 2:
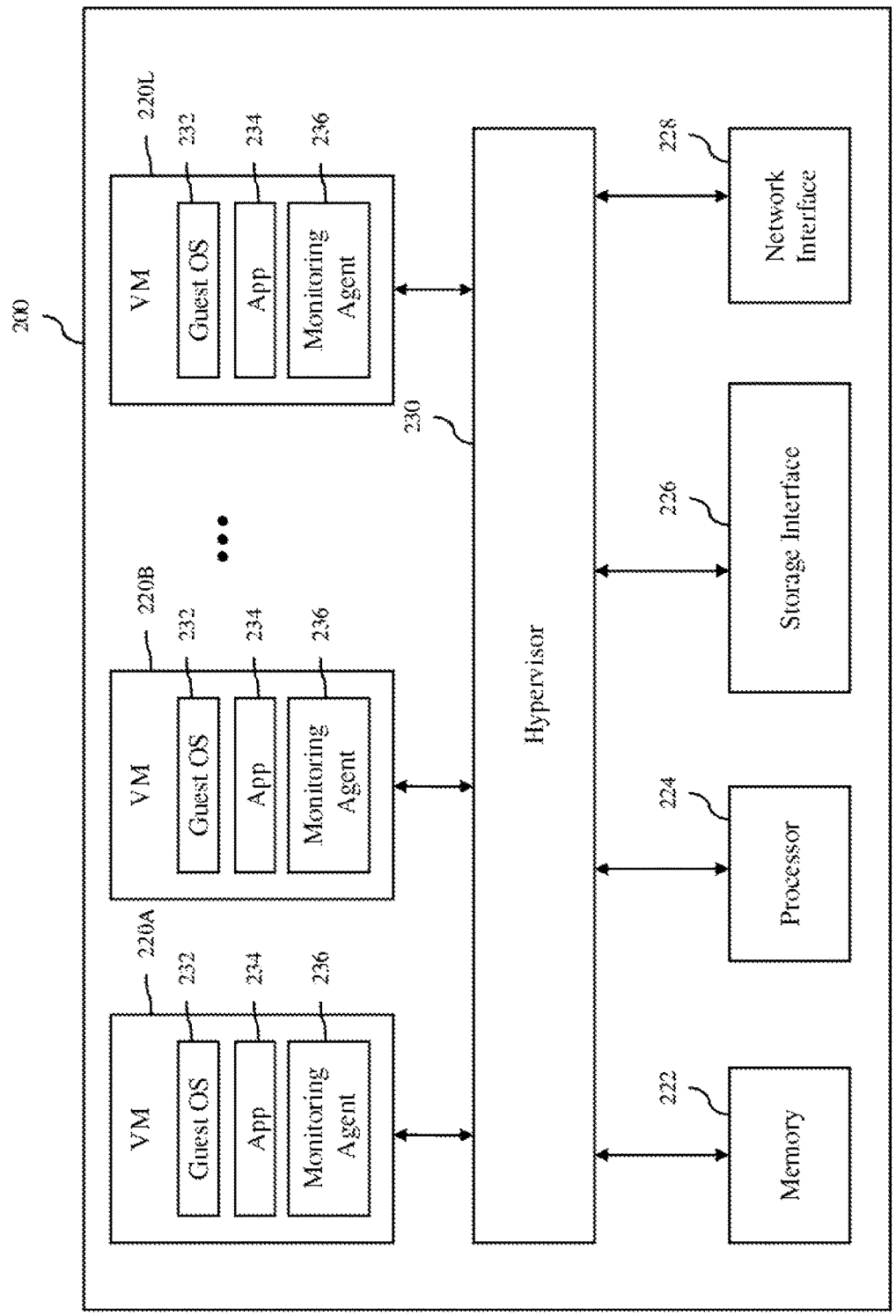
FIG. 2 is a block diagram of a host computer in accordance with an embodiment of the invention.

Turning now to FIG. 2, components of a host computer 200 that is representative of the host computers H-1, H-2 . . . H-M in the clusters C-1, C-2 . . . C-N in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory, which may be random access memory (RAM), is the primary memory of the host computer. The processor can be any type of a processor, such as a central processing unit (CPU) commonly found in a server. The storage interface is an interface that allows that host computer to communicate with the storage 104. As an example, the storage interface may be a host bus adapter or a network file system interface. The network interface is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232, one or more guest applications 234 and a monitoring agent 236. The guest operating system manages virtual system resources made available to the corresponding VM by the hypervisor, and, among other things, the guest operating system forms a software platform on top of which the guest applications run. The monitoring agent is a software program running in the VM to monitor and report resource metrics for that VM to the management system 106. These resource metrics may reflect availability, performance, utilization, and throughput for each resource type being monitored, such as CPU, memory, storage and network. The monitoring agent may also provide information regarding the health of the VM, such as heartbeat notifications and other health related information. In an embodiment, the monitoring agent is a Hyperic Agent that reports to a Hyperic Server, which may be included in the management system.

Similar to any other computer system connected to the network 102, the VMs 220A, 220B ... 220L are able to communicate with other computer systems connected to the network using the network interface 228 of the host computer 200. In addition, the VMs are able to access the storage 104 using the storage interface 226 of the host computer. Thus, the applications 234 and the monitoring agents 236 of the VMs are capable of communicating with other entities connected to the network.

Turning back to FIG. 1, each of the load balancers 108 in the clusters C-1, C-2 ... C-N operates to distribute the workload between the clients running on the host computers H-1, H-2 ... H-M in the respective cluster. Each load balancer may use various operational metrics to balance the load. In some implementations, the load balancers may be part of cluster management servers, such as VMware® vCenter™ servers ("VMware" and "vCenter" are trademarks of VMware, Inc.). In a particular implementation, each load balancer may be part of a VMware vSphere® Distributed Resource Scheduler™ (DRS) ("VMware vSphere" and "Distributed Resource Scheduler" are trademarks of VMware, Inc.).

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers H-1, H-2 ... H-M of the clusters C-1, C-2 ... C-N, which can be accessed like any other storage device connected to computer systems. In an embodiment, the storage can be accessed by entities, such as clients (e.g., VMs) running on the host computers, using any file system, e.g., virtual machine file system (VMFS) or network file system (NFS). The storage includes one or more computer data storage devices 110, which can be any type of storage devices, such as solid-state devices (SSDs), hard disks or a combination of the two. The storage devices may operate as components of a network-attached storage (NAS) and/or a storage area network (SAN). The storage includes a storage managing module 112, which manages the operation of the storage. In an embodiment, the storage managing module is a computer program executing on one or more computer systems (not shown) of the storage. The storage supports multiple datastores DS-1, DS-2 ... DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For VMs, the datastores may be used to store virtual storage e.g., virtual disks, used by each of the VMs, as well as other files needed to support the VMs. One or more datastores may be associated with one or more host computers. Thus, each host computer is associated with at least one datastore. Some of the datastores may be grouped into one or more clusters of datastores, which are commonly referred to as storage pods.

The management system 106 operates to monitor and manage the host computers H-1, H-2 ... H-M of the clusters C-1, C-2 ... C-N and/or the storage 104 of the distributed computer system 100. In particular, the management system operates to detect poor-performing clients, e.g., virtual machines, that are supporting one or more applications, which may include large scale applications, and to quickly replace the poor-performing clients with healthy replacement clients. The replacement clients may be maintained in a pool of clients in standby mode, which may involve powering down the clients. In an embodiment, the pool of clients is associated with a deployment profile so that the replacement clients can be properly activated when replacing one or more poor-performing clients. In some situations, the detected poor-performing clients may be restarted and placed back in the pool to be used in the future as a replacement client. In other situations, the detected poor-performing clients may be de-provisioned and new clients may be deployed to replace the replacement clients. The management system is described in more detail below.

Figure 3:
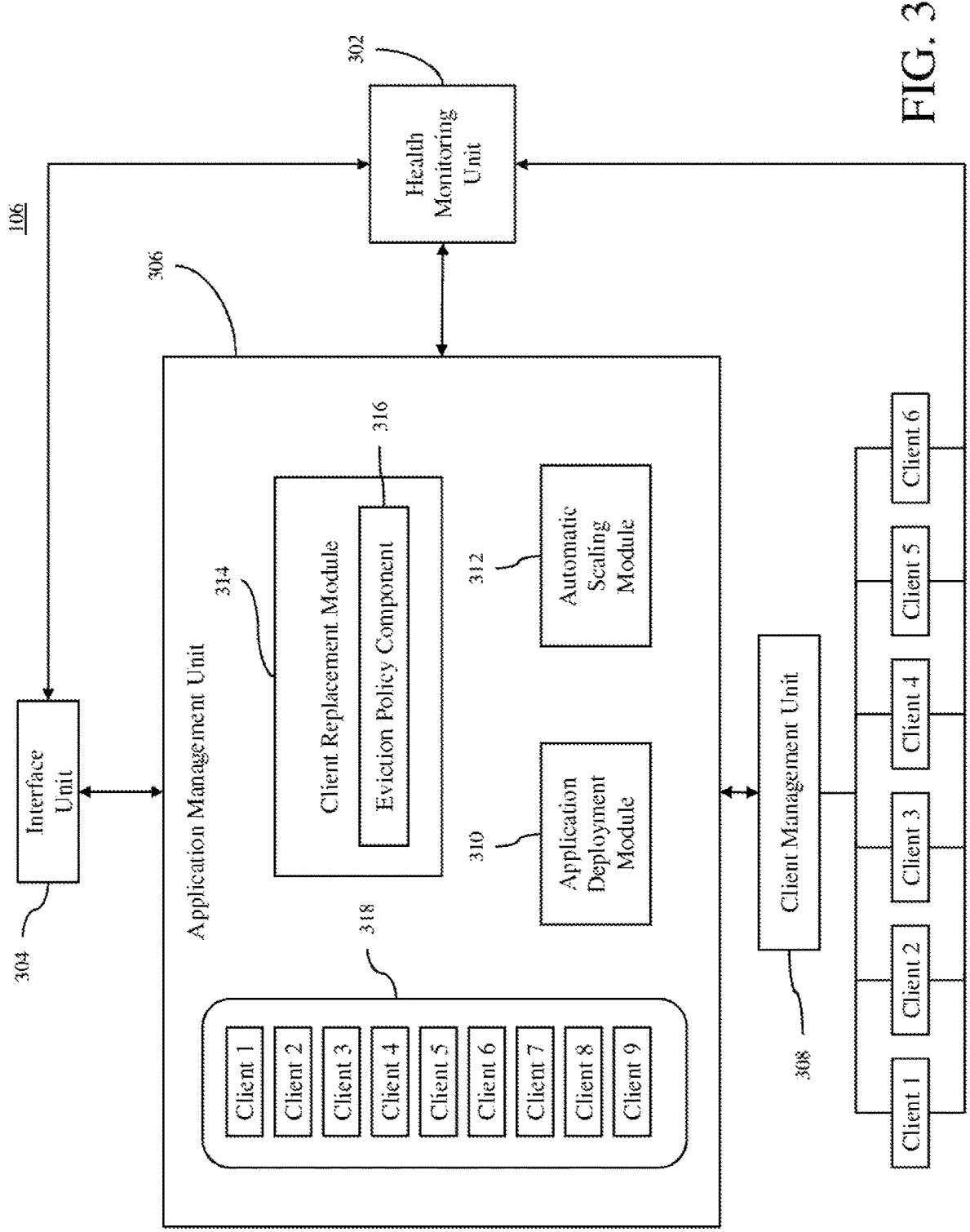
FIG. 3 is a block diagram illustrating components of a management system in accordance with an embodiment of the invention.

Turning now to FIG. 3, components of the management system 106 in accordance with an embodiment of the invention are illustrated. As shown in FIG. 3, the management system includes a health monitoring unit 302, an interface unit 304, an application management unit 306 and a client management unit 308. These components of the management system can be implemented as software, hardware or a combination of software and hardware. In some embodiments, at least some of these components of the management system are implemented as one or more software programs running in one or more computer systems, which may be physical computer systems or virtual computer systems, such as VMs, using one or more processors associated with the computer systems. These components may reside in a single computer system or in multiple computer systems.

The health monitoring unit 302 operates to receive and process health-related information from the clients, e.g., VMs, running a large scale application, e.g., multi-tier application, on the host computers in the distributed computer system 100. In particular, the health monitoring unit operates to detect poor-performing clients based on the received information. As an example, the health monitoring unit may determine that a client is a poor-performing client based on performance of operations being executed by the client and/or response time of the client for one or more task requests. The health monitoring unit may use any known technique to detect poor-performing clients. In an alternative embodiment, the operations performed by the health monitoring module may be provided to the management system by a third party service provider that monitors the clients running in the distributed computer system.

In an embodiment, the health monitoring unit 302 contacts the interface unit 304 with poor-performing client information. This may be done periodically or when one or more poor-performing clients are detected by the health monitoring unit. The poor-performing client information may be transmitted from the health monitoring unit to the interface unit using POST Hypertext Transfer Protocol (HTTP) requests via an application programming interface (API). As an example, the poor-performing client information may include the names, the internet protocol (IP) addresses and the associated application name(s) for the detected poor-performing clients.

The interface unit 304 operates to process the poor-performing client information sent by the health monitoring unit to initiate a remediation action to resolve the problem of the detected poor-performing clients. In an embodiment, the interface unit sends a request to the application management unit 306 to replace the detected poor-performing client with an appropriate healthy replacement client. In some implementations, the interface unit may be part of a vScale service module or a DevOps monitoring module provided by VMware, Inc., which has been modified to send the replacement request when a poor-performing client has been detected.

The application management unit 306 operates to deploy and manage one or more large scale applications running in the distributed computer system 100. As shown in FIG. 3, the application management unit includes an application deployment module 310, an automatic scaling module 312 and a client replacement module 314 with an eviction policy component 316. These components of the application management unit can be implemented as software, hardware or a combination of software and hardware. In some embodiments, at least some of these components of the application management unit are implemented as one or more software programs running in one or more computer systems, which may be physical computer systems or virtual computer systems, such as VMs using one or more processors associated with the computer systems. These components may reside in a single computer system or in multiple computer systems. The application management module may include additional components that perform operations to deploy and manage the large scale applications miming in the distributed computer system. In some implementations, the application management unit may be based on an Application Director provided by VMware, Inc., and thus, includes components commonly found in such a product.

The application deployment module 310 operates to deploy large scale applications to run in the distributed computer system 100. Deployment of a large scale application includes deploying a pool of clients, which includes a group of clients that will run the large scale application (referred to herein as "active clients") and clients that can be used to quickly replace one or more poor-performing clients running the application when enabled (referred to herein as "replacement clients"). In FIG. 3, an example of a pool 318 of clients deployed by the application deployment module for a large scale application is shown. In this example, there are nine clients numbered from 1 to 9, where the clients 1-6 are currently active in running a large scale application and the clients 7-9 are not currently active in running the large scale application. In some embodiments, the clients 7-9 are idle or in standby mode to be used as replacement clients when one or more of the clients 1-6 are identified as poor-performing clients. The application deployment module deploys a large scale application according to a predefined application structure, which includes at least software components, dependencies and configurations. In an embodiment, the application deployment module employs a deployment profile when deploying a large scale application. A deployment profile includes various settings, such as cloud templates, networks, and application configuration values allowed for use in specific deployment environments. In a particular implementation, the application deployment module may be an application deployment module in a VMware vCloud® Application Director™, and the deployment profile is a deployment profile used in such application deployment module ("vCloud" and "Application Director" are trademarks of VMware, Inc.).

The automatic scaling module 312 operates to automatically scale-out or scale-in a large scale application. A scale-out operation is a process of adding one or more clients to a group of active clients running a large scale application when needed, for example, to increase the processing capacity of the active clients that are running the application as a whole. A scale-in operation is a process of removing one or more clients from the group of active clients running the large scale application when needed, for example, to reduce the resource consumption of the active clients. The automatic scaling module may perform the scale-out and scale-in operations according to any scaling technique. In a particular implementation, the automatic scaling unit may be a vScale™ module in a vCloud Application Director.

The client replacement module 314 operates to replace a poor-performing client in a pool of clients that is actively running a large scale application with a replacement client from the pool of clients. In response to a client replacement request from the interface unit 304, the client replacement module selects an idle client from the pool of clients to replace the poor-performing client identified in the client replacement request. The client replacement module then proceeds to replace the poor-performing client with the selected idle client. In an embodiment, the replacement process involves first waking up the idle client chosen from the pool of clients. Then, a scale-out operation is triggered in which the selected client is added to the group of active clients currently executing the large scale application. With the scale-out operation, the load balancer of the cluster in which the selected client resides is updated with the information of the selected client, which may involve adding the IP address of the selected client to the current list of IP addresses of the currently active clients being managed by the load balancer. The scale-out operation is followed by a scale-in operation to remove the poor performing client from the group of active clients currently executing the large scale application. Thus, the number of clients actively running the large scale application remains the same before and after the replacement process. With the scale-in operation, the load balancer of the cluster in which the poor-performing client resides is updated with the information of the selected client, which may involve deleting the IP address of the poor-performing client from the current list of IP addresses of the currently active clients being managed by the load balancer. In some situations, the active clients running the large scale application, and the replacement clients for the large scale application, may all reside in a single cluster of host computers in the distributed computer system 100. In other situations, the active clients running the large scale application, and the replacement clients for the large scale application, may reside in different clusters of host computers in the distributed computer system.

As part of the replacement process, the client replacement module 314 also updates the pool of clients to reflect the replacement. The updating of the pool of clients involves the eviction policy component 316, which checks the severity of the poor-performing client by communicating with the health monitoring unit 302 and receives performance information of the poor-performing client from the health monitoring unit. If the severity level of the poor-performing client is low, e.g., below a threshold, the replaced client, i.e., the poor-performing client, is restarted and placed in a standby mode. In an embodiment, the poor-performing client is restarted with a mandate that all software services, which have been installed during application deployment, are background services since these software services may not be started when the client is restarted.

However, if the severity level of the poor-performing client is high, e.g., above the threshold, the replaced client, i.e., the poor-performing client, is de-provisioned and removed from the pool of clients. In addition to the poor-performing client being de-provisioned, which may involve deleting the poor-performing client, a client provisioning request is initiated to deploy or create a new client for the large scale application and placed in the pool of clients in standby mode. This new client will be idle and ready to replace a poor-performing client among the active clients executing the large scale application.

The client management unit 308 to manage the clients running a large scale application. As an example, the client management unit may manage the active clients 1-6 that are currently running a large scale application, as illustrated in FIG. 3. The client management unit is able to execute various operations for the management of the active clients running a large scale application. In particular, the client management unit is able to wake up any standby client in the distributed computer system 100 and to restart any of the active clients. In a particular implementation, the client management unit may be a vCloud® Automation Center™ or a VMware vCloud® Director ("vCloud" and "Automation Center" are trademarks of VMware, Inc.). Thus, at least in this implementation, the client management unit includes components and functionalities of such a tool.

Figure 4A:
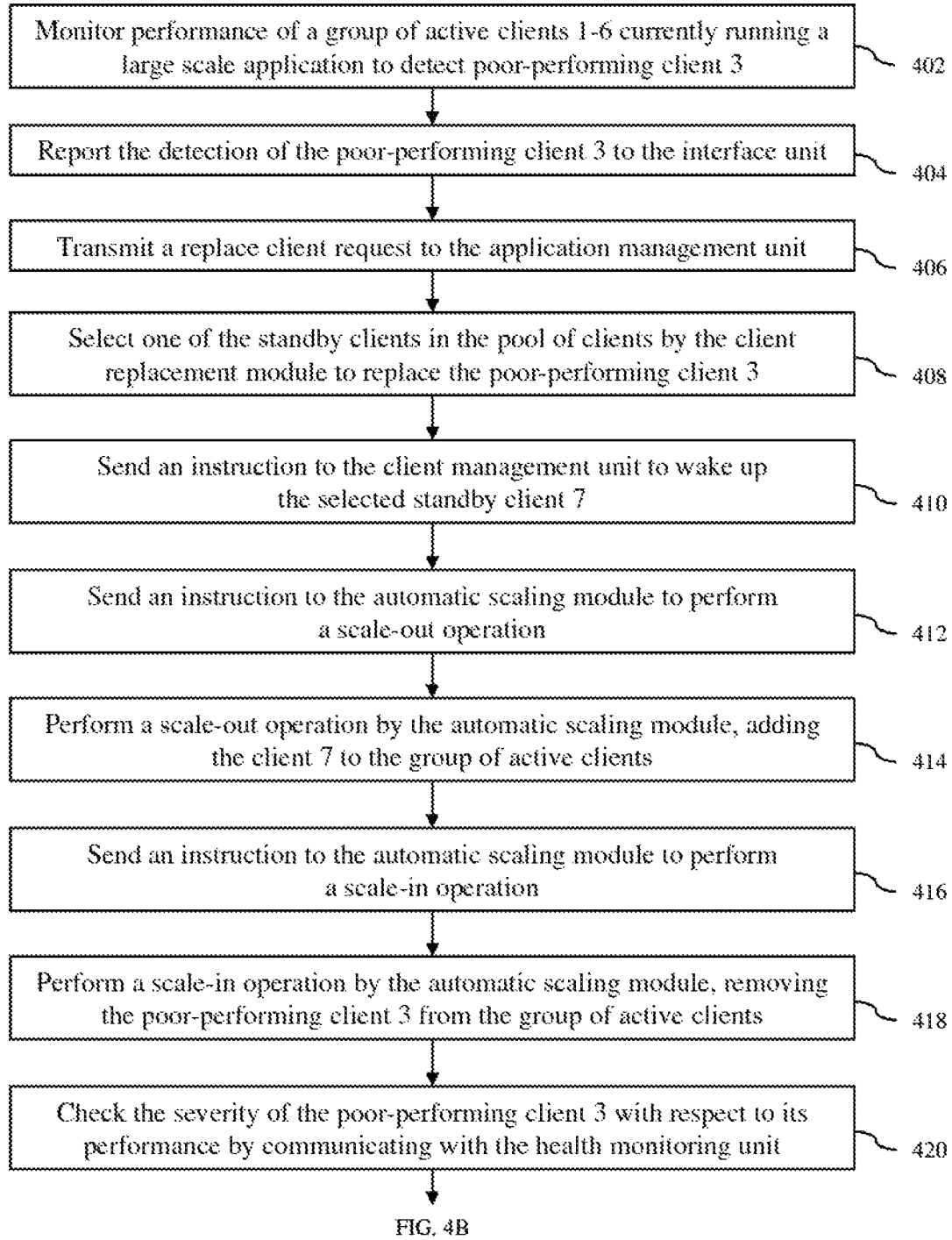
FIGS. 4A and 4B show a process flow diagram of the operation of the management system in accordance with an embodiment of the invention.
Figure 4B:
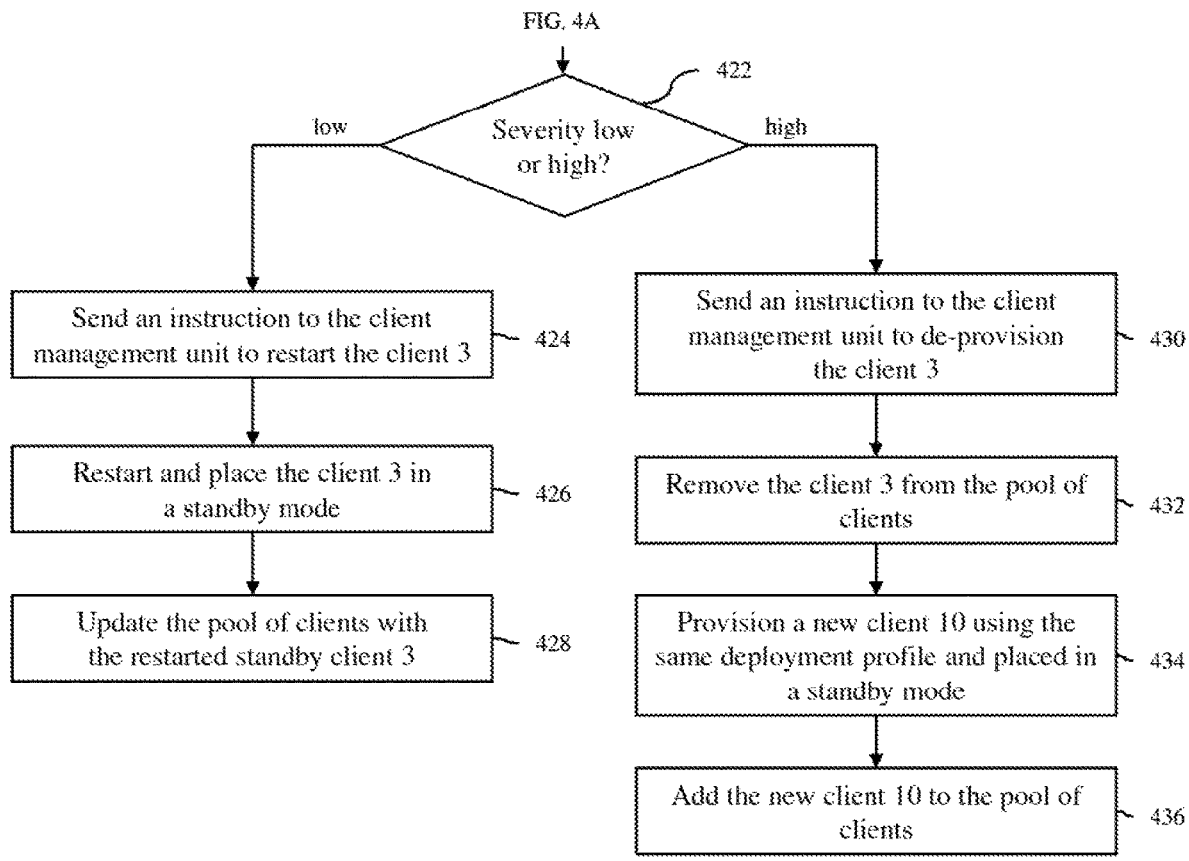
Figure 5A:
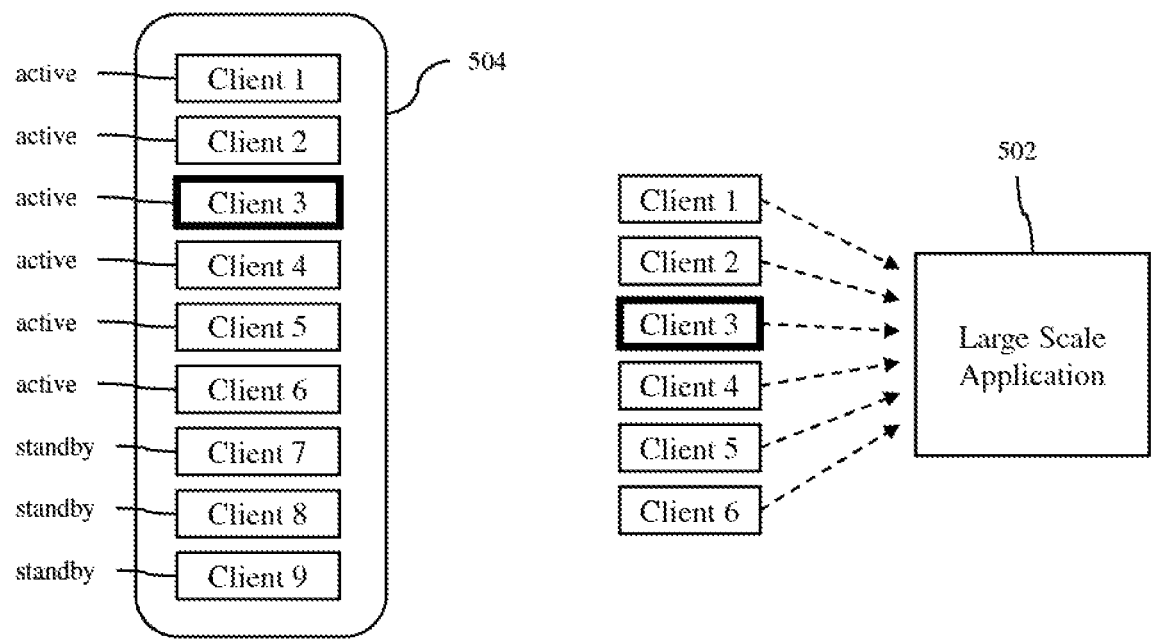
FIGS. 5A-5G show an example of an active client being replaced by the management system in accordance with an embodiment of the invention.

The operation of the managing system 106 in accordance with an embodiment of the invention is described with reference to a flow diagram shown in FIGS. 4A and 4B using an example illustrated in FIGS. 5A-5G. In this example, a large scale application 502 has been deployed, which involved provisioning clients 1-9, as shown in FIG. 5A. The clients 1-6 are currently running the large scale application and clients 7-9 are replacement clients that are in standby mode. The clients 1-9 form a pool 502 clients for this particular large scale application. Currently, the client 3 is performing poorly enough to be identified as a poor-performing client, e.g., below a performance threshold. At block 402, the performances of a group of active clients currently running the large scale application, i.e., the clients 1-6, are monitored by the health monitoring unit 302 to detect any poor-performing clients among the active clients. In this example, the client 3 would have been detected as a poor-performing client since this client is sufficiently performing poorly.

Next, at block 404, the detection of the poor-performing client 3 is reported to the interface unit 304 from the health monitoring unit 302. As an example, this information regarding the poor-performing client 3 may be reported using a POST HTTP request via an API. Next, at block 406, a replace client request is transmitted to the application management unit 306 from the interface unit, which is routed to the client replacement module 314.

Figure 5B:
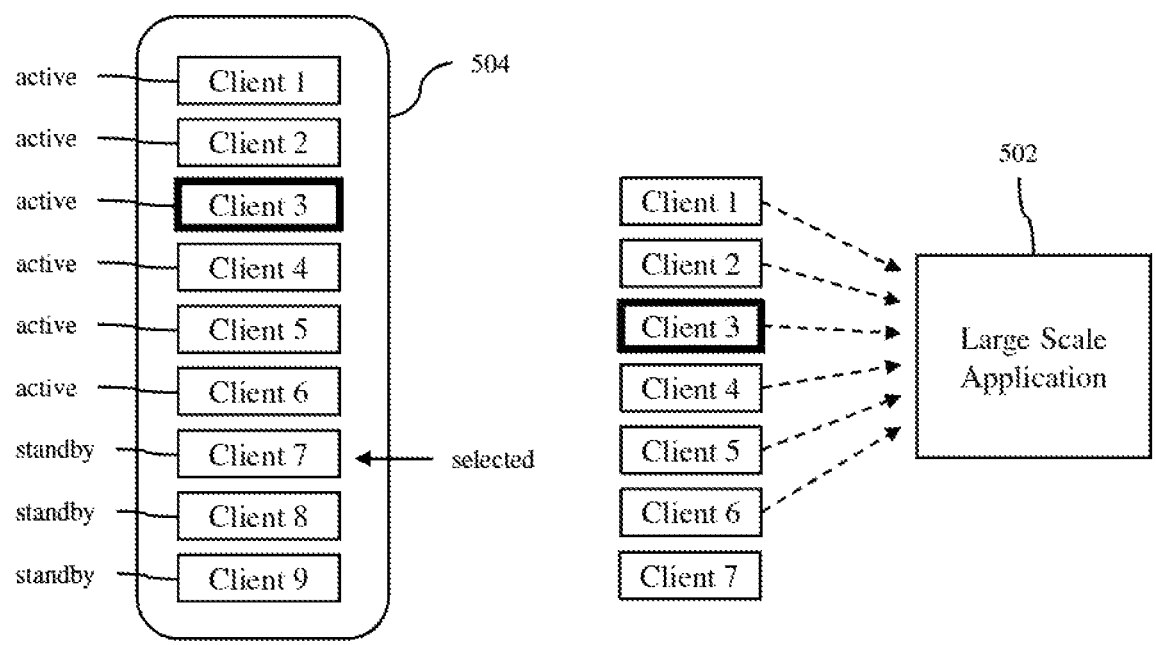

Next, at block 408, one of the standby clients in the pool of clients is selected by the client replacement module 314 to replace the poor-performing client 3. In this example, the replacement client 7 is selected, as illustrated in FIG. 5B. However, any of the replacement clients in the pool of clients could have been selected. Next, at block 410, an instruction is sent to the client management unit 308 from the client replacement module to wake up the selected standby client 7.

Figure 5C:
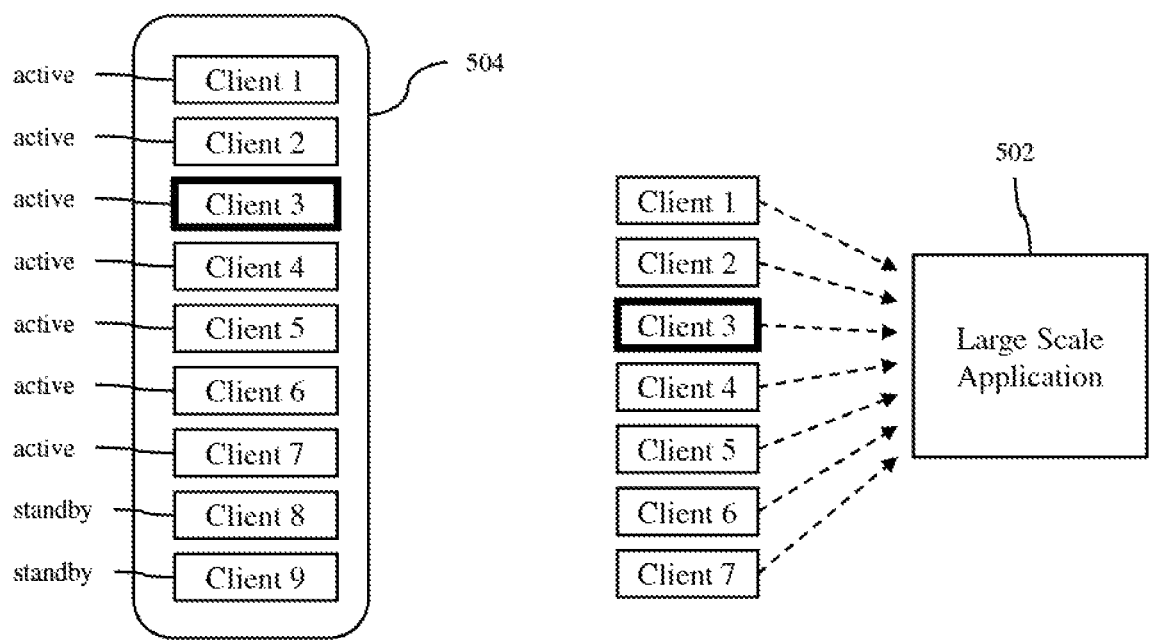
Figure 5D:
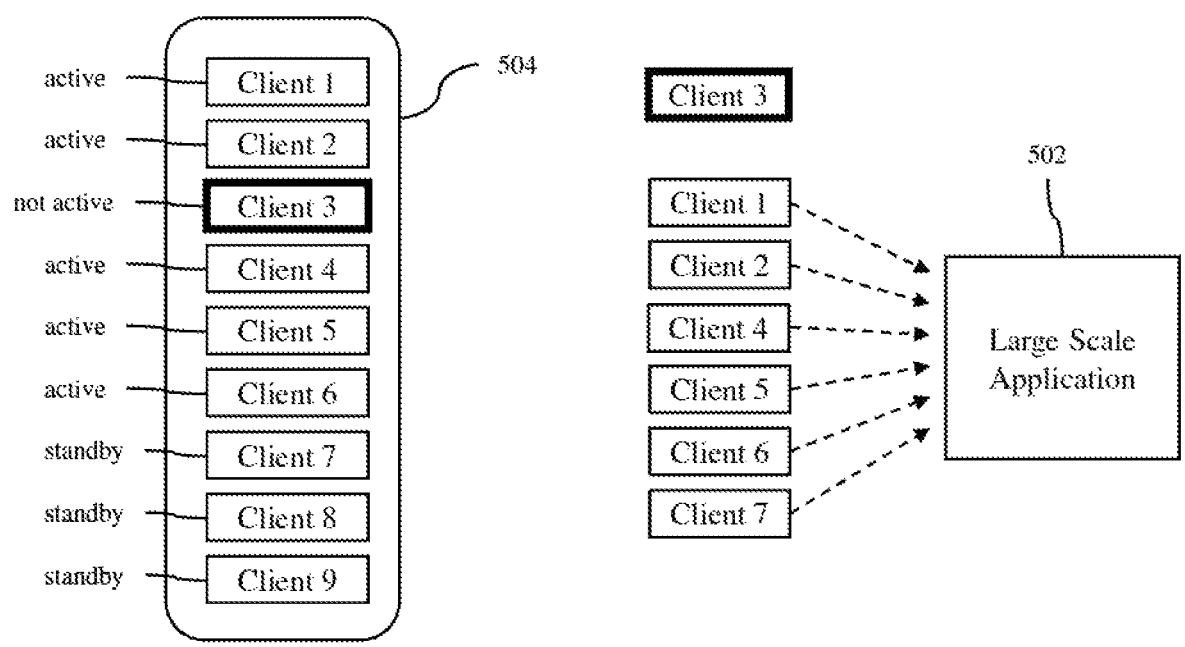

Next, at block 412, an instruction is sent to the automatic scaling module 312 from the client management module 314 to perform a scale-out operation. Next, at block 414, a scale-out operation is performed by the automatic scaling module, during which the selected replacement client 7 is added to the group of active clients executing the large scale application, as illustrated in FIG. 5C. Next, at block 416, an instruction is sent to the automatic scaling module from the client management module to perform a scale-in operation. Next, at block 418, a scale-in operation is performed by the automatic scaling module, during which the poor-performing client 3 is removed from the group of active clients executing the large scale application, as illustrated in FIG. 5D.

Figure 5E:
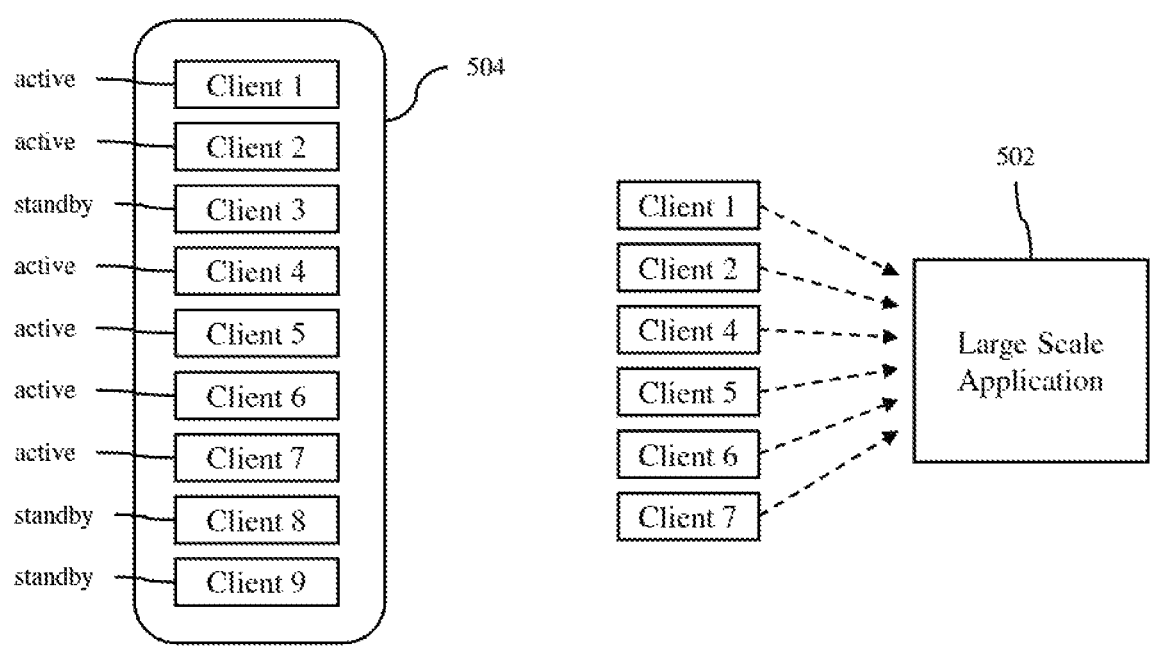

Next, at block 420, the severity of the poor-performing client 3 with respect to its performance is checked by the eviction policy component 316 by communicating with the health monitoring unit 302. Next, at block 422, a determination is made whether the severity of the poor-performing client 3 is low or high by the eviction policy component. If the severity is low, then an instruction is sent to the client management unit 308 from the eviction policy component to restart the poor-performing client 3, at block 424. Next, at block 426, the poor-performing client 3 is restarted and then placed in a standby mode by the client management unit. Next, at block 428, the pool of clients is updated by the client replacement module 314 to indicate that the client 3 is now in standby mode and ready to be used for client replacement, as illustrated in FIG. 5E.

Figure 5F:
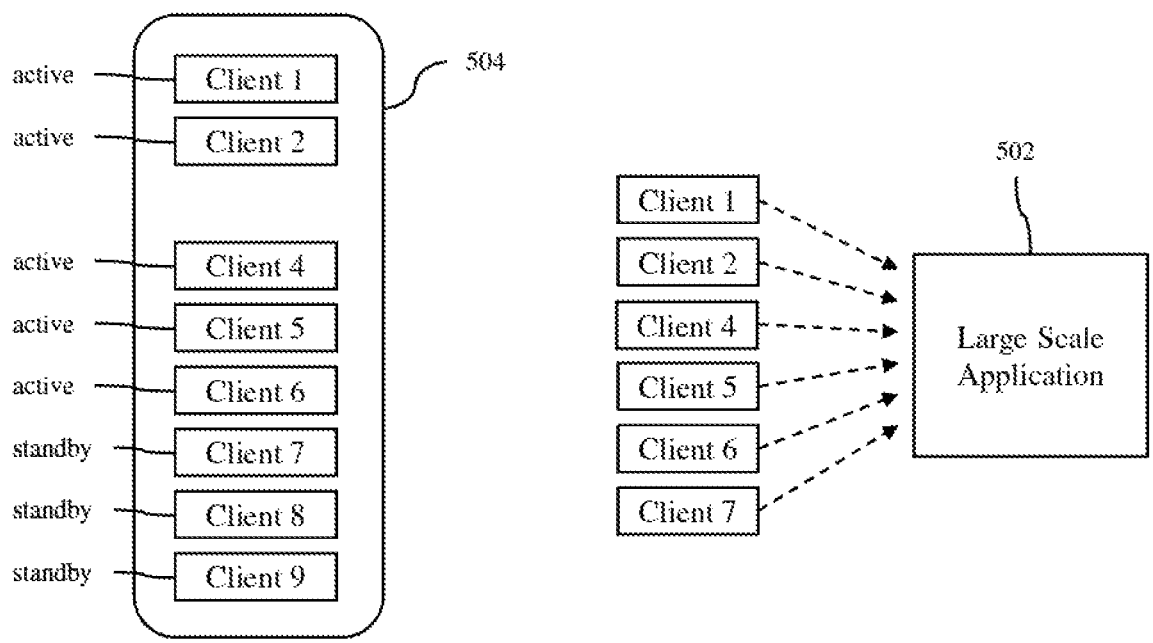
Figure 5G:
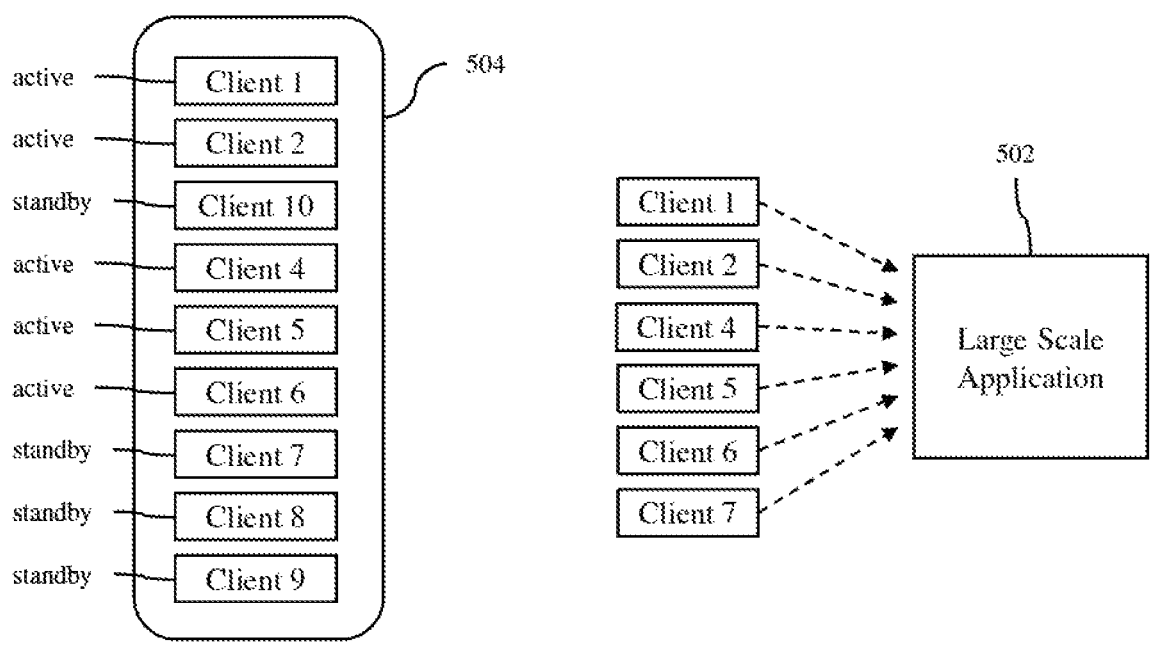

If at block 422, it is determined that the performance severity of the poor-performing client 3 is high, then an instruction is sent to the client management unit 308 from the eviction policy component 316 to de-provision the poor-performing client 3, at block 430. Next, at block 432, the client 3 is removed from the pool of clients by the client replacement module 314, as illustrated in FIG. 5F. Next, at block 434, a new client 10 is provisioned using the same deployment profile that was used to deploy the clients 1-9 and placed in standby mode. Next, at block 436, the new client 10 is added to the pool of clients by the client replacement module to indicate that the client 10 is ready to be used for client replacement, as illustrated in FIG. 5G.

In this manner, poor-performing clients that are running large scale applications can be quickly replaced with standby replacement clients, which include the various software and configurations that are needed to run the large scale applications, so that any adverse affect on the services provided by the large scale application is minimized.

Although the replacement process performed by the management system 106 has been described with respect to replacement of poor-performing clients, this replacement process may be used to quickly replace active application clients for any reason. As an example, the replacement process performed by the management system may be used for rolling upgrades of active application clients. In this example, similar to the replacement of poor-performing client, each of the active application clients will be replaced with a standby application client in a pool of clients. However, the application client being replaced will be loaded or installed with the necessary update software before being placed back the pool of clients as a standby client until all of the clients or at least the active application clients in the pool of clients have been updated.

Figure 6:
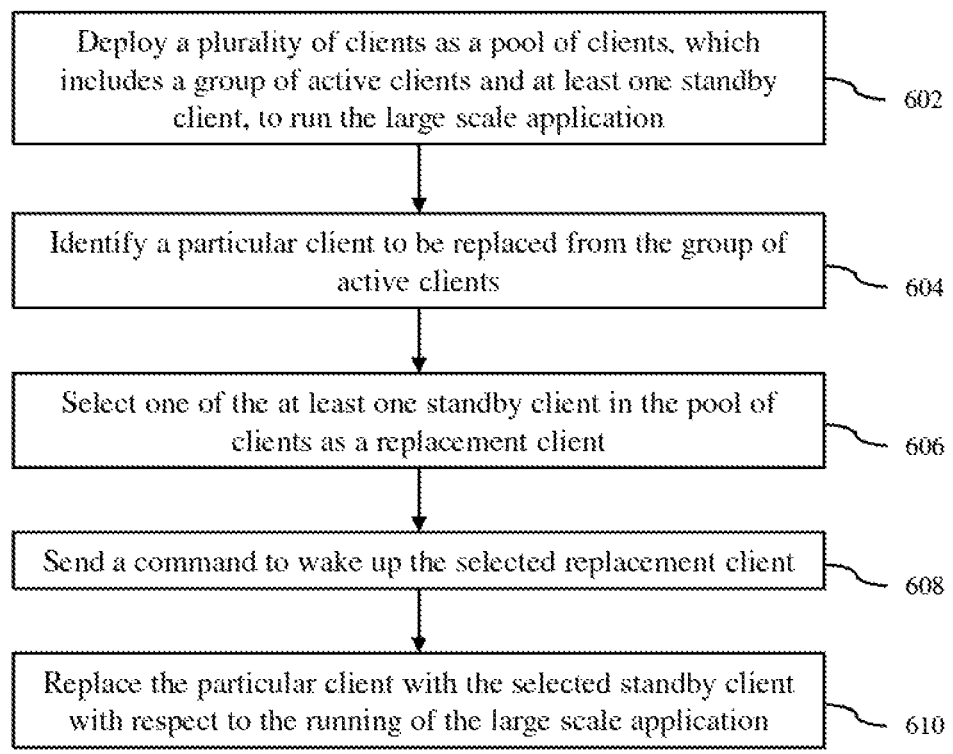
FIG. 6 is a flow diagram of a method for efficiently replacing clients running a large scale application in accordance with an embodiment of the invention.

A method for efficiently replacing clients running a large scale application in accordance with an embodiment of the invention is now described with reference to the process flow diagram of FIG. 6. At block 602, a plurality of clients is deployed as a pool of clients to run the large scale application. The pool of clients includes a group of active clients that will be running the large scale application and at least one standby client. In some embodiments, the active clients and the at least one standby client include the same software and/or configurations to run the large scale application during deployment. Next, at block 604, a particular client to be replaced is identified from the group of active clients. In some embodiments, the particular client may be a poor-performing client or a client that needs to be updated. Next, at block 606, one of the at least one standby client in the pool of clients is selected as a replacement client. Next, at block 608, a command is sent to wake up the selected replacement client. Next, at block 610, the particular client is replaced with the selected replacement client with respect to the running of the large scale application such that the particular client is removed from the group of active clients and the selected replacement client is added to the group of active clients.

Although the operations of the method(s) herein are shown and described in a particular order, the order of the operations of each method may be altered on that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for efficiently replacing clients running a large scale application, the method comprising:
deploying a plurality of clients as a pool of clients to run the large scale application, the pool of clients including a group of active clients that will be running the large scale application and at least one standby client that is not currently active in running the large scale application, a standby client being a client that has been powered down to a standby mode;
identifying a particular client to be replaced from the group of active clients in the pool of clients that are currently running the large scale application; wherein the identifying the particular client to be replaced includes detecting a poor-performing active client from the group of active clients in the pool of clients that are currently running the large scale application based on a performance of one or more operations being executed by the poor-performing active client and a response time of the poor-performing active client for a task request, wherein the poor-performing active client is the particular client to be replaced;
selecting one of the at least one standby client in the pool of clients as a replacement client;
sending a command to wake up the selected replacement client;
replacing the particular client with the selected replacement client with respect to the running of the large scale application such that the particular client is removed from the group of active clients and the selected replacement client is added to the group of active clients;
restarting the poor-performing active client and placing the restarted poor performing active client in the standby mode in the pool of clients when a severity level of the poor-performing active client with respect to performance of the large scale application does not exceed a threshold; and
deleting the poor-performing active client from the pool of clients and initiating a client provisioning request to create a new client in the pool of clients in the standby mode for the large scale application when the severity level of the poor performing active client with respect to performance of the large scale application does exceed the threshold.

2. The method of claim 1, wherein the poor-performing active client is an active client that is performing below a performance threshold.

3. The method of claim 1, further comprising:
executing a software upgrade on the particular client after the particular client has been replaced; and
adding the upgraded particular client to the pool of clients as a standby client.

4. The method of claim 1, wherein the deploying the plurality of clients includes deploying the plurality of clients using a deployment profile such that each of the plurality of clients is deployed using the same deployment profile.

5. The method of claim 1, wherein the replacing the particular client with the selected replacement client includes:
initiating a scale-out operation to add the selected replacement client to the group of active clients; and
initiating a scale-in operation to remove the particular client from the group of active clients.

6. A system for efficiently replacing clients running a large scale application comprising:
  memory;
  at least one processor programmed to:
    deploy a plurality of clients as a pool of clients to run the large scale application, the pool of clients including a group of active clients that will be running the large scale application and at least one standby client that is not currently active in running the large scale application, a standby client being a client that has been powered down to a standby mode;
    identify a particular client to be replaced from the group of active clients in the pool of clients that are currently running the large scale application, wherein the identifying the particular client to be replaced includes detecting a poor-performing active client from the group of active clients in the pool of clients that are currently running the large scale application based on a performance of one or more operations being executed by the poor-performing active client and a response time of the poor-performing active client for a task request, wherein the poor-performing active client is the particular client to be replaced;
    select one of the at least one standby client in the pool of clients as a replacement client;
    send a command to wake up the selected replacement client;
    replace the particular client with the selected replacement client with respect to the running of the large scale application such that the particular client is removed from the group of active clients and the selected replacement client is added to the group of active clients;
    restart the poor-performing active client and place the restarted poor-performing active client in the standby mode in the pool of clients when a severity level of the poor-performing active client with respect to performance of the large scale application does not exceed a threshold; and
    delete the poor-performing active client from the pool of clients and initiate a client provisioning request to create a new client in the pool of clients in the standby mode for the large scale application when the severity level of the poor performing active client with respect to performance of the large scale application does exceed the threshold.

7. The system of claim 6, wherein the poor-performing active client is an active client that is performing below a performance threshold.

8. The system of claim 6, wherein the at least one processor is further configured to initiate a scale-out operation to add the selected replacement client to the group of active clients, and to initiate a scale-in operation to remove the particular client from the group of active clients.

9. A non-transitory computer-readable storage medium containing program instructions for a method for efficiently replacing clients running a large scale application, wherein execution of the program instructions by one or more processors of a computer system causes the one or more processors to perform steps comprising:
  deploying a plurality of clients as a pool of clients to run the large scale application, the pool of clients including a group of active clients that will be running the large scale application and at least one standby client that is not currently active in running the large scale application, a standby client being a client that has been powered down to a standby mode;
  identifying a particular client to be replaced from the group of active clients in the pool of clients that are currently running the large scale application, wherein the identifying the particular client to be replaced includes detecting a poor-performing active client from the group of active clients in the pool of clients that are currently running the large scale application based on a performance of one or more operations being executed by the poor-performing active client and a response time of the poor-performing active client for a task request, wherein the poor-performing active client is the particular client to be replaced;
  selecting one of the at least one standby client in the pool of clients as a replacement client;
  sending a command to wake up the selected replacement client;
  replacing the particular client with the selected replacement client with respect to the running of the large scale application such that the particular client is removed from the group of active clients and the selected replacement client is added to the group of active clients;
  restarting the poor-performing active client and placing the restarted poor performing active client in the standby mode in the pool of clients when a severity level of the poor-performing active client with respect to performance of the large scale application does not exceed a threshold; and
  deleting the poor-performing active client from the pool of clients and initiating a client provisioning request to create a new client in the pool of clients in the standby mode for the large scale application when the severity level of the poor performing active client with respect to performance of the large scale application does exceed the threshold.

10. The computer-readable storage medium of claim 9, wherein the poor-performing active client is an active client that is performing below a performance threshold.

11. The computer-readable storage medium of claim 9, wherein the steps further comprise:
  executing a software upgrade on the particular client after the particular client has been replaced; and
  adding the upgraded particular client to the pool of clients as a standby client.

12. The computer-readable storage medium of claim 9, wherein the deploying the plurality of clients includes deploying the plurality of clients using a deployment profile such that each of the plurality of clients is deployed using the same deployment profile.

13. The computer-readable storage medium of claim 9, wherein the replacing the particular client with the selected replacement client includes:
  initiating a scale-out operation to add the selected replacement client to the group of active clients; and
  initiating a scale-in operation to remove the particular client from the group of active clients.

* * * * *